（12) United States Patent
Isaksson (10) Patent No.: US 10,279,848 B2
(45) Date of Patent: May 7, 2019

(54) SANDWICH ELEMENT AND A LOAD FLOOR MADE AS SUCH AN ELEMENT

(71) Applicant: SSAB TECHNOLOGY AB, Stockholm (SE)

(72) Inventor: Anders Isaksson, Falun (SE)

(73) Assignee: SSAB TECHNOLOGY AB, Stockholm (SE)

( * ) Notice: Subject to any disclaimer, the term of this patent is extended or adjusted under 35 U.S.C. 154(b) by 151 days.

(21) Appl. No.: 14/894,846

(22) PCT Filed: May 28, 2014

(86) PCT No.: PCT/SE2014/050658
§ 371 (c)(1),
(2) Date: Nov. 30, 2015

(87) PCT Pub. No.: WO2014/193301
PCT Pub. Date: Dec. 4, 2014

(65) Prior Publication Data
US 2016/0129947 A1    May 12, 2016

(30) Foreign Application Priority Data
May 30, 2013    (SE) ..................................... 1350656

(51) Int. Cl.
*B62D 25/20*    (2006.01)
*E04B 5/02*    (2006.01)
*B62D 65/02*    (2006.01)

(52) U.S. Cl.
CPC ......... *B62D 25/2054* (2013.01); *B62D 65/02* (2013.01); *E04B 5/02* (2013.01)

(58) Field of Classification Search
CPC .... B62D 25/2054; B62D 25/20; B62D 29/04; E04B 5/02; E04B 5/00
(Continued)

(56) References Cited
U.S. PATENT DOCUMENTS 1,784,368 A    12/1930  Loucks
2,962,323 A *  11/1960  McBride .............. B62D 33/048
                                              105/375

(Continued)

FOREIGN PATENT DOCUMENTS

CN    201738476    2/2011
CN    103010316    4/2013
(Continued)

OTHER PUBLICATIONS

International Search Report for PCT/SE2014/050658, dated Nov. 13, 2014, 2 pages.
(Continued)

*Primary Examiner* — Hilary L Gutman
(74) *Attorney, Agent, or Firm* — Ballard Spahr LLP (57) ABSTRACT

A sandwich element (10) including a first restriction layer (21) and a second restriction layer (22) and a distance core (23) of a light weight material, preferably of a foam material, between said restriction layers, whereby the second restriction layer (22) includes stiffening elements (11) arranged in parallel with each other and individually or together with a corresponding abutting stiffening element (11) form a closed hollow profile (24). Furthermore the invention refers to a load floor shaped as such a sandwich element and also that such a load floor is a part of a cargo vehicle.

17 Claims, 4 Drawing Sheets

(58) Field of Classification Search
USPC .................................................. 296/184.1
See application file for complete search history.

(56) References Cited

U.S. PATENT DOCUMENTS

| | | | | |
|---|---|---|---|---|
| 3,192,099 | A * | 6/1965 | Foyster | A47B 96/205 |
| | | | | 108/51.3 |
| 3,195,699 | A | 7/1965 | Johnston | |
| 3,392,500 | A | 7/1968 | Johnston | |
| 3,496,691 | A | 2/1970 | Seaburg et al. | |
| 3,528,875 | A | 9/1970 | MacDonald et al. | |
| 3,583,123 | A | 6/1971 | Holmgren et al. | |
| 3,715,846 | A | 2/1973 | Sullhofer | |
| 4,656,809 | A * | 4/1987 | Wilson | B62D 33/046 |
| | | | | 296/182.1 |
| 5,287,671 | A * | 2/1994 | Ueki | E04B 5/40 |
| | | | | 52/578 |
| 5,403,063 | A | 4/1995 | Sjostedt et al. | |
| 5,566,522 | A * | 10/1996 | Ålander | E04B 5/40 |
| | | | | 428/183 |
| 5,916,093 | A * | 6/1999 | Fecko | B61D 17/005 |
| | | | | 52/17 |
| 6,092,862 | A * | 7/2000 | Kuwahara | B62D 29/043 |
| | | | | 296/184.1 |
| 6,109,684 | A * | 8/2000 | Reitnouer | B62D 33/02 |
| | | | | 280/795 |
| 6,247,747 | B1 * | 6/2001 | Kawanomoto | B60J 5/0498 |
| | | | | 296/181.3 |
| 6,357,191 | B1 | 3/2002 | Ault et al. | |
| 7,310,919 | B2 * | 12/2007 | Grossman | B65D 88/742 |
| | | | | 52/263 |
| 7,353,960 | B2 * | 4/2008 | Seiter | B61D 17/18 |
| | | | | 105/355 |
| 8,272,190 | B2 * | 9/2012 | Schiffmann | B29C 44/1285 |
| | | | | 52/270 |
| 8,534,028 | B2 * | 9/2013 | Wojtusik | E04B 1/0007 |
| | | | | 52/270 |
| 2004/0187416 | A1 | 9/2004 | Grossman et al. | |
| 2006/0251851 | A1 * | 11/2006 | Bowman | E04B 5/043 |
| | | | | 428/71 |
| 2015/0110988 | A1 * | 4/2015 | Peavey | B32B 9/00 |
| | | | | 428/68 |

FOREIGN PATENT DOCUMENTS

| | | |
|---|---|---|
| EP | 0 178 858 | 4/1986 |
| EP | 0 635 418 | 1/1995 |
| EP | 1 457 408 | 9/2004 |
| JP | 10-72904 | 3/1998 |
| WO | WO 85/03679 | 8/1985 |

OTHER PUBLICATIONS

Chinese Office Action dated Jan. 16, 2017 in CN 201480036416.7 and English translation, 17 pages.

* cited by examiner

SANDWICH ELEMENT AND A LOAD FLOOR MADE AS SUCH AN ELEMENT

This application is the U.S. national phase of International Application No. PCT/SE2014/050658 filed 28 May 2014, which designated the U.S. and claims priority to SE Patent Application No. 1350656-3 filed 30 May 2013, the entire contents of each of which are hereby incorporated by reference.

TECHNICAL FIELD

The present invention refers to the field of sandwich elements being provided with stiffening beams or profiles. Sandwich elements having such stiffening are above all suitable for load floors, e.g. in trucks, trailers and the like. The sandwich elements are of the type consisting of a foamed core as separate material between a first surface and a second surface.

INTRODUCTION

Through EP 1 457 408 a floor of a cargo space of a vehicle is known per se, e.g. of a truck or a trailer. The floor is built up with a horizontal lower support layer shaped as a profiled plate forming parallel webs having an even top side aimed at supporting an upper cover layer. The top cover layer is made of a moulded fibre material or of a plastic material or of a metal plate arranged to lay in a planar fashion onto the profiled plate and in such a way form a floor with stiffening webs. The cover layer is made of moulded fibre material being fixed by riveting or screwing onto the profiled plate. Such a cover layer has to be sufficient stiff not to be bent in the cross direction when loaded and to be planar to lie close to the planar parts of the support layer as well. This implies that the cover layer and thus all the floor will be rather heavy compared to the load it has to carry. Furthermore the rivet joints or screw joints connecting the cover layer with the support layer will involve undesired indications of fracture in the cover layer.

Through U.S. Pat. No. 5,403,063 a floor for a vehicle is known per se, which floor is in shape of a dual wall plate construction having a top layer and a lower layer and a filling material is applied between the layers to increase the strength and thermal isolation of the floor. Furthermore the underside of the floor is provided with beams to increase the bending resistance still more. The plate construction involves a number of webs connecting the two layers to each other and where the filling material is arranged within the areas confined by the webs and the layers. Though the plate construction is in shape of a composite material it will be rather heavy compared to the load it has to carry. Furthermore the method of supplying the filling to the areas confined by the webs and the layers is complicated and time consuming. The plate construction may be armed to increase the strength and resistance but in such a case the weight of the construction will be still higher.

Through U.S. Pat. No. 3,715,846 a self-supporting isolation element is known per se, which consists of a first restriction layer and a second restriction layer, between the layers there is a hard foam material. Furthermore the lower layer has integrated profiles being faced inwards against the top layer and accordingly being imbedded in the foam material. At one embodiment described the profiles are in shape of a hollow profile having a triangular cross section, where one side of the cross section is parallel with the first restriction layer. A problem of this previously known isolation element is that the triangular hollow profiles contribute only to a restricted reinforcement of the isolation element as they are placed inside the isolation element and having the even parallel side of the triangular hollow profiles close to the first restriction layer. Furthermore the orientation of the triangular hollow profiles is such that the isolation element tends to be bent downwards in the cross direction as the profiles will be opened when exposed for a sufficient great vertical load. The isolation element shown is to be used for roofs and walls with low loads at the self supporting elements. These isolation elements are not suitable for use as floors where the loads are considerably higher and still less suitable for floors in cargo vehicles having still higher loads.

The present invention aims to attain an improved sandwich element having same good or improved qualities and function compared to previous known sandwich elements, in particular when used as load floors in vehicles. The load floors according to the invention obtain a corresponding stiffness and strength at a reduced weight and a simplified manufacturing method which taken together results in an improved load economy.

SUMMARY

By the present invention as it is defined by the independent claim the purposes mentioned above are met with. Suitable embodiments of the invention are defined by the dependent claims.

The invention has in view to obtain a sandwich element being provided with a restriction layer including a closed hollow profile, which acts as a stiffening element. Such a closed hollow profile contributes to increase the rotation stiffness and the bending resistance as well of the sandwich element.

Furthermore the invention has in view to obtain a sandwich element having a thin core but provided with integrated stiffening elements at the underside. The advantages with such a sandwich element are that it has a low weight in that the two layers can be made with thin walls and in that the material of the core has low density and the layer including the stiffening elements is simple to produce by bending, pressing or rolling of a flat plate. It will stand heavier loads in proportion to its weight than the sandwich elements known as the material of the stiffening elements can be lead out from the core and in such a way contribute to a higher bending resistance of the sandwich element. Especially such sandwich elements are suitable for use as floors, which are affected of vertically directed loads and in particular as floors in cargo vehicles as the vertical directed loads on a vehicle floor tending to bend the vehicle floor are effectively accumulated by a bending resistive sandwich element shaped according to the invention. The advantages by such a sandwich element are on one hand that the stiffening elements are integrated with the second restriction layer of the sandwich element and on the other hand that a maximum material of the stiffening elements is at a distance from the thin core of the sandwich element.

The invention relates to a sandwich element including a first restriction layer and a second restriction layer. Between these restriction layers there is a distance core of a light weight material. Preferably the distance core is made of a foam material being injected and brought to hardening. Alternatively the distance core can be made of solid plates being glued onto the two restriction layers. The second restriction layer is shaped, e.g. bent to include stiffening elements arranged in parallel with each other and which individually or together with a corresponding abutting stiffening element forms a closed hollow profile. The stiffening element obtained by cold forming of the hollow profile is situated on and fixed to the underside of the second restriction layer and is pointing outwards from the second restriction layer of the sandwich element and thus laying outside of the distance core. Thus the hollow profile is integrated with the second restriction layer which in turn is a part of the sandwich element. Having a closed hollow profile has the benefit that the distance material does not penetrate the profile. The hollow profile may be closed either by being bent or rolled to abutment, riveted or welded along a contact line at the restriction layer. Also the manufacturing methods, including pressing, may be suitable for forming of the second restriction layer with the integrated hollow profiles or the parts of the hollow profiles. All the forming methods involve those usually being included under the concept cold forming, such as bending, pressing or rolling. By these manufacturing methods an over-bending of the second restriction layer is a favourable forming method to obtain an abutment between connecting surfaces and thereby to avoid gaps between the surfaces. Furthermore the surfaces abutting each other at the distance core will be further tightened after the injection and hardening of the distance core or when gluing the same in the case it has the shape of solid plates. The hollow profile of the stiffening elements may also be formed by two similar designed or matching parts of the second restriction layer being added to the stiffening element and kept together by connection means for instance by a press action. Alternatively the attachment of the connection means to the stiffening element/elements can be made by glue, tape, laser welding, etc.

At embodiments of the invention the hollow profile is formed with a material accumulation in the shape of reinforcement at a maximum distance from the distance core. It may either be in form of an increased thickness of material or be made by a stiffening bar. The increased thickness of material in a triangular hollow profile can be produced by gluing a plane steel strip onto the plane surface in a triangular hollow profile being parallel with the first restriction layer.

In an embodiment of the invention the second restriction layer between two adjacent stiffening elements is plane, whereby the first and the second restriction layers are parallel with each other. In this embodiment the second restriction layer with the respective stiffening elements is formed with an invariable thickness of material. This embodiment may be further developed by making its thickness of material thicker within the area around the hollow profile, especially at the hollow profile where its surface is farthest away from the distance core.

According to an embodiment of the sandwich element the second restriction layer between two adjacent stiffening elements has the shape of a single bent surface. This embodiment accumulates loads in the element by introduction of compressive stress in a way corresponding to an arch at a bridge construction. In such a way the sandwich element can be made lighter for the same weight class.

According to another embodiment of the sandwich element the bent surface is positioned to have its greatest distance from the first restriction layer at the contact line in the second restriction layer. This embodiment distributes the compressive stress down into the stiffening elements.

According to an embodiment said single bent surface at a cross section in a normal to and through the sandwich element, made at right angle to the extension of the stiffening element, is symmetrical about a normal to the first restriction layer positioned just between two stiffening elements In other embodiments of the invention stiffening element at a cross section normal to its length direction has the shape of an isosceles triangle.

In other embodiments of the invention the stiffening element at a cross section normal to its length direction has the shape of an equilateral triangle.

The advantages with such triangular designed stiffening elements is to position as much material as possible as far from the centre of gravity as possible, which results in the best strength in the length direction. A closed hollow profile, irrespective of being triangular or having another cross section, results in a rotation rigid section contributing to a strength also in the weak direction, the cross direction. In such a way the core, mainly determining the strength in the cross direction, can be made thinner. In that the stiffening element is integrated in the lower, second restriction layer a more simple process is obtained which results in a more cost effective end product.

In further embodiments of the invention the stiffening element has a plane side positioned in parallel to the first restriction layer.

In other embodiments of the invention the plane side of the stiffening element and parts of adjacent sides of the stiffening element are reinforced by an increased thickness of material compared to the rest of the thickness of the second restriction layer or compared to the rest of the thickness of the stiffening element. The increased thickness of material can be localized around the whole or around parts or at special places of the hollow profile.

For these triangular stiffening elements the increased thickness of material has been obtained in that a reinforcing bar is enclosing the plane parallel side of the triangular means. The embodiment is advantageous also at those embodiments where the stiffening elements are formed by two complementary parts, which have been connected in the middle of respective stiffening element to keep the complementary parts together. Also reinforcing by a plane glued metal strip as mentioned above is a suitable reinforcement of the hollow profile. This type of reinforcement is especially suitable when the hollow profile is made up by two complementary parts.

For all the embodiments it is advantageous that the projecting distance $h_2$ of the stiffening element from the second restriction layer at the connection line on the second restriction layer is larger than the largest perpendicular distance $h_1$ between the first restriction layer and the second restriction layer. At plane and parallel restriction layers, $h_1$ is constant.

Triangular hollow profiles are advantageous in that these obtain most possible material as far as possible from the distance core in that they are localized with a plane side in parallel with the first restriction layer.

Though the shape of the stiffening element has been indicated by a shape of a symmetrical triangular cross section profile also other closed profile shapes are conceivable within the scope of the invention. Such profile shapes are indicated in the figures enclosed.

Further embodiments of the hollow profile of the stiffening element include pressed or bent stiffening grooves in the hollow profile surface. To produce such grooves the whole plane basic material for the second restriction layer can be formed with such grooves.

For all the embodiments shown at the stiffening elements in form of the closed cross section profiles they can be arranged on a quite plane second restriction layer or at a restriction layer that has a uniform arch between each stiffening element.

In the embodiments shown and described both the restriction layers are made of metal material, preferably being rolled steel plates which have been heat treated in a suitable manner in dependence on of the range of application. Other alternatives are aluminium plates being shaped in a suitable manner, alternatively as extruded hollow profiles of aluminium. The lower, second restriction layer obtains a greater stiffness in the length direction if the material of the plate can be concentrated to the area for the hollow profile and preferably to outermost surface of the hollow profile at the largest distance from the distance core.

The invention also refers to a load floor shaped as a sandwich element according as described above. At such a load floor the first restriction layer is a top layer of the load floor and the second restriction layer is a lower layer of the sandwich element in the load floor. Preferably such load floors are used in storerooms or the like.

In an advantageous use of load floors according to the invention the load floor is a part of a cargo vehicle. Such cargo vehicles can be trailers, delivery vans, lorries and heavier cargo vehicles as well.

BRIEF DESCRIPTION OF THE DRAWINGS

Now the invention will be described more in detail with help of embodiments and with reference to the accompanying drawings, where.

DESCRIPTION OF THE INVENTION

Figure 1:
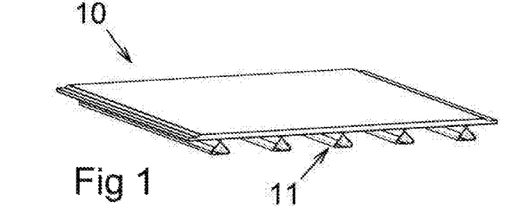
FIG. 1 shows a view in perspective of a load floor according to a first embodiment of the invention.

FIG. 1 shows a first embodiment of a sandwich element 10 in the shape of a plate, which sandwich element is provided with parallel stiffening elements 11 at one of its sides. In all the embodiments shown the stiffening elements are situated at the underside of the sandwich element, which means that the sandwich element can be used as a load floor.

Figure 2:
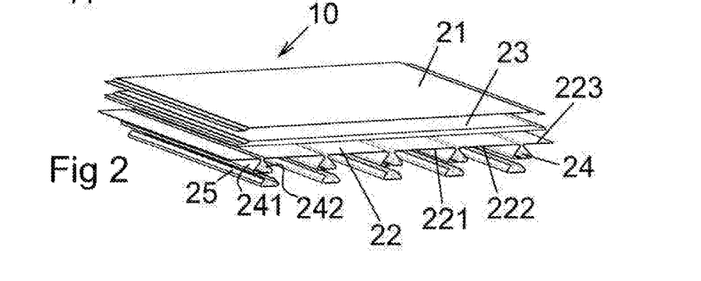
FIG. 2 shows an exploded view of the load floor according to FIG. 1.

FIG. 2 shows an exploded view of the load floor according to FIG. 1, where the sandwich element 10 includes a first restriction layer 21 and a second restriction layer 22 and a distance core 23 of a light weight material, preferably a foam material, between the restriction layers 21, 22. The distance core in the shape of plate material is glued onto the two restriction layers. The restriction layers and the distance core together form the sandwich element 10. The second restriction layer 22 is in the embodiment shown in the shape of plane layer parts 221, 222, each one being bent to include mutual parallel going stiffening elements 241, each one of which together with a corresponding abutting stiffening element 242 form a hollow profile 24. The hollow profile 24 is reinforced and kept together with help of a reinforcing bar 25. The stiffening elements in shape of hollow profiles act as load consuming beams being integrated in the sandwich element.

Figure 3:
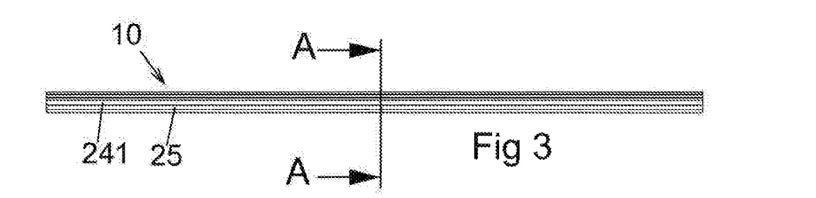
FIG. 3 shows a side view of the load floor according to FIG. 1.

FIG. 3 shows in a side view the sandwich element 10 with a length going stiffening element 241 and corresponding reinforcing bar 25.

Figure 4:
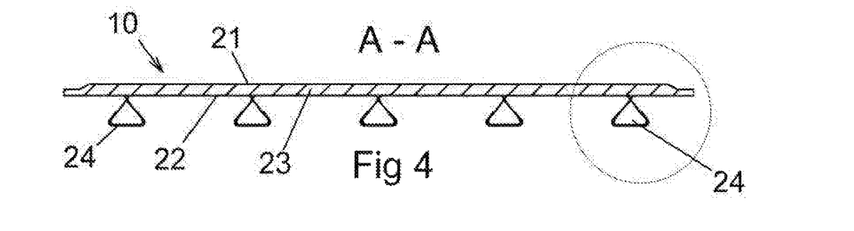
FIG. 4 shows a cross section A-A according to FIG. 3.

FIG. 4 shows a cross section through the sandwich element 10 with the first restriction layer 21, the second restriction layer 22, the distance core 23 and the hollow profile 24.

Figure 5:
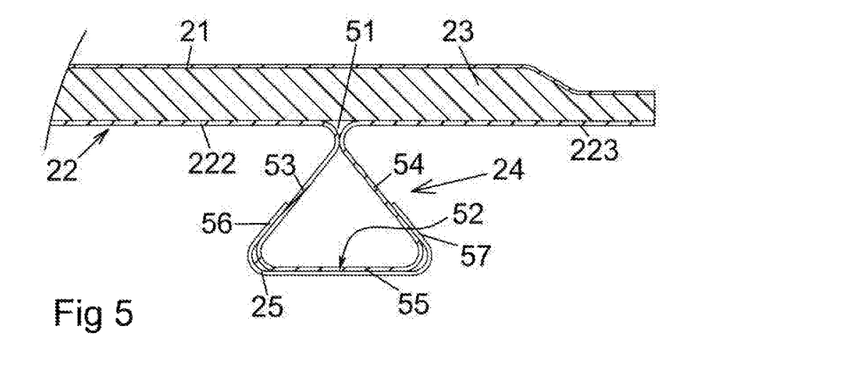
FIG. 5 shows an enlargement according to FIG. 4.

FIG. 5 shows by an enlargement the first restriction layer 21, the second restriction layer 22, the distance core 23 and the hollow profile 24. The hollow profile 24 is formed by the plane layer parts 222, 223, each one of which at least along one side is bent to a part being one half of the hollow profile in the embodiment shown. The hollow profile is closed along the contact line 51 at the second restriction layer 22. Furthermore the plane layer parts 222, 223 are abutting each other along a joint line 52 in the hollow profile 24 according to the embodiment shown. Furthermore the plane layer parts 222, 223 are bent together forming an isosceles triangle having the legs 53, 54 and the top thereof coinciding with the contact line 51. The base 55 of the triangle is orientated in parallel with the second restriction layer 22, which in the embodiment shown is plane between the hollow profiles 24. The figure shows the reinforcing bar 25 as well, which is provided with two branches 56, 57 abutting the two legs 53, 54 of the triangle. The reinforcing bar forms on one hand a joining part for the two layer parts 222, 223 and on the other hand a reinforcing piece of the hollow profile 24. Thereby the plane side of the stiffening element corresponding to a part of the base 55 and the parts of the adjacent sides 53, 54 of the stiffening element are reinforced by an increased thickness of material compared to the rest of the thickness of material of the second restriction layer 22 or compared to the rest of the thickness of material of the stiffening element 241, 242 corresponding to the legs 53, 54 of the triangle. Furthermore according to the embodiment shown in FIG. 5 the triangular shape of the hollow profile 24 corresponds to an equilateral triangle. In this embodiment the distance core 23 can be either injected between the two restriction layers 21, 22 or onto the restriction layer 22 or alternatively applied as complete plate elements.

Figure 6:
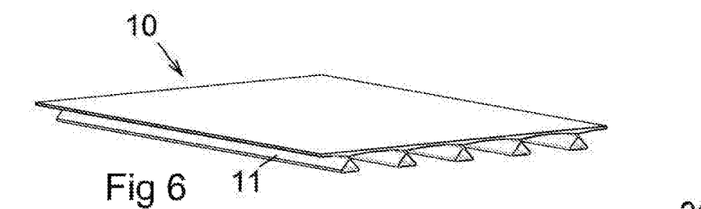
FIG. 6 shows a view in perspective of a load floor according to a second embodiment of the invention.

FIG. 6 shows a second embodiment of the sandwich element 10 according to the invention. Also this embodiment is provided with parallel stiffening elements 11 at one side of which.

Figure 7:
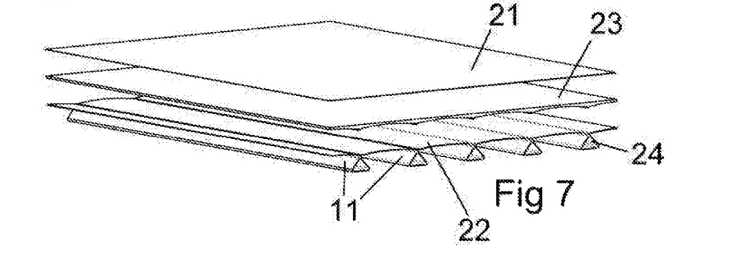
FIG. 7 shows an exploded view of the load floor according to FIG. 6.

FIG. 7 shows an exploded view of the embodiment according to FIG. 6, where the sandwich element includes a first restriction layer 21 and a second restriction layer 22 and a distance core 23 of a light weight material, preferably a foam material, between the restriction layers 21, 22. Also in this embodiment the distance core in the shape of plate material can be glued onto the two restriction layers. The restriction layers and the distance core together form the sandwich element 10. The second restriction layer 22 is in the embodiment shown in the shape of a plane metal plate having a constant thickness, which has been rolled to include the parallel stiffening elements 11. As is made clear of the figure each one of the stiffening elements 11 forms a hollow profile 24. Furthermore after the rolling the metal plate has obtained a bent form between each stiffening element. Thus between two adjacent stiffening elements the second restriction layer has the shape of a bent area. The bending has such a shape that the distance core has got the largest thickness in front of the stiffening elements. By giving the second restriction layer 22 such a shape a lighter construction is obtained with maintained strength.

Figure 8:
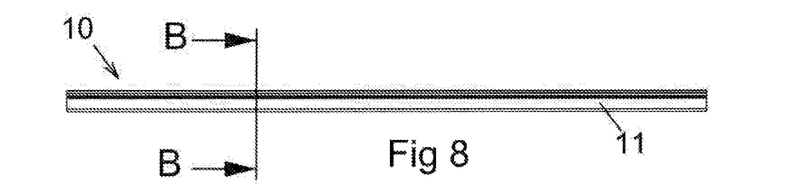
FIG. 8 shows a side view of the load floor according to FIG. 6.

FIG. 8 shows by a side view the sandwich element 10 with a longitudinal stiffening element 11 and at the one side of the sandwich element.

Figure 9:
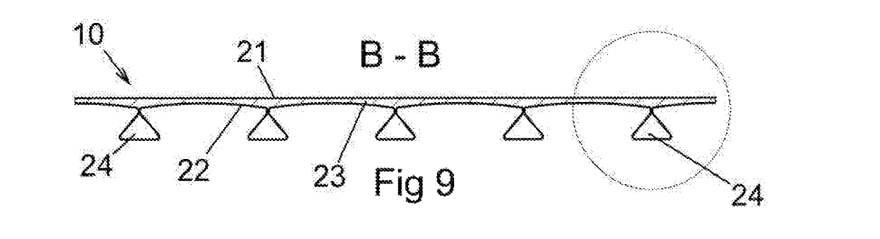
FIG. 9 shows a cross section B-B according to FIG. 8.

FIG. 9 shows a cross section through the sandwich element 10 with the first restriction layer 21, the second restriction layer 22, the distance core 23 and the hollow profiles 24.

Figure 10:
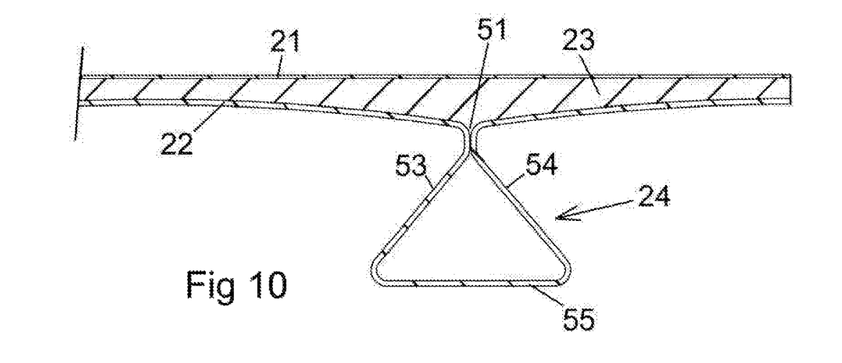
FIG. 10 shows an enlargement according to FIG. 9.

FIG. 10 shows by an enlargement the first restriction layer 21, the second restriction layer 22, the distance core 23 and the hollow profile 24. The hollow profile 24 is formed by the plane metal plate being bent by e.g. rolling to the complete second restriction layer 22 as indicated above. Thus in the embodiment shown the hollow profile 24 is an integrated part of the second restriction layer 22 and therefore has the same thickness of material as the rest of the second restriction layer 22. Also in this embodiment the hollow profile 24 is closed along a contact line 51 at the second restriction layer 22. Also in this embodiment the hollow profile 24 forms an isosceles triangle with the legs 53, 54 and the top thereof coinciding with the contact line 51. The base 55 of the triangle is orientated in parallel with the second restriction layer 22. According to the embodiment shown in FIG. 10 the triangular shape of the hollow profile 24 corresponds to an equilateral triangle.

Figure 11:
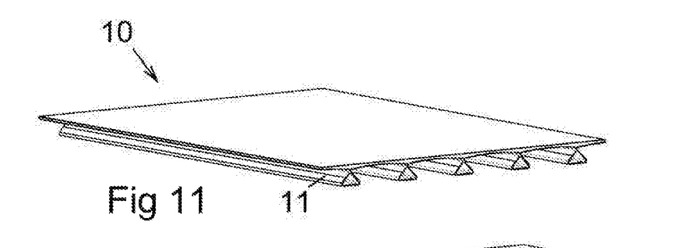
FIG. 11 shows a view in perspective of a load floor according to a third embodiment of the invention.

FIG. 11 shows a third embodiment of the sandwich element 10 according to the invention. Also this embodiment is provided with parallel stiffening elements 11 at one side of the same.

Figure 12:
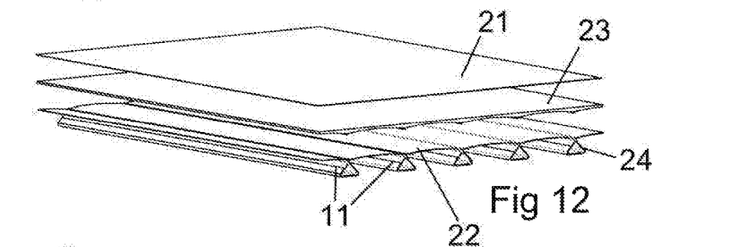
FIG. 12 shows an exploded view of the load floor according to FIG. 11.

FIG. 12 shows an exploded view of the embodiment according to FIG. 11, constructed in the same way as already being shown in FIG. 7 where the sandwich element is shown with the first restriction layer 21, the second restriction layer 22 and the distance core 23 between the restriction layers 21, 22. As described above also this sandwich element includes the parallel stiffening elements 11. As is made clear by the figure each one of the stiffening elements 11 forms a hollow profile 24. Also in this embodiment the second restriction layer 22, after the roll shaping, has obtained a bent form between each stiffening element 11. Thus between two adjacent stiffening elements the second restriction layer has the shape of a bent area. The bending has such a shape that the distance core has got the largest thickness in front of the stiffening elements. By giving the second restriction layer 22 such a shape a lighter construction is obtained with maintained strength.

Figure 13:
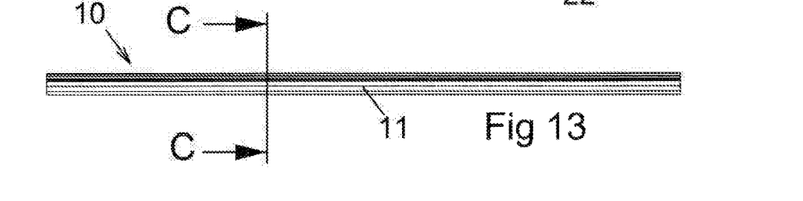
FIG. 13 shows a side view of the load floor according to FIG. 11.

FIG. 13 shows in a side view the sandwich element 10 with a longitudinally stiffening element 11 and at the one side of the sandwich element.

Figure 14:
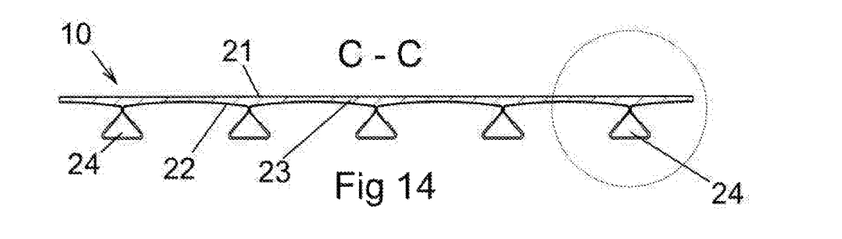
FIG. 14 shows a cross section C-C according to FIG. 13.

FIG. 14 shows a cross section through the sandwich element 10 with the first restriction layer 21, the second restriction layer 22, the distance core 23 and the hollow profiles 24.

Figure 15:
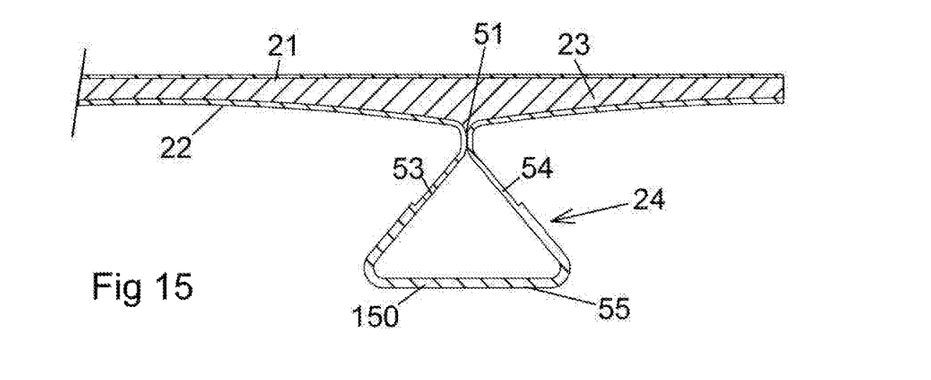
FIG. 15 shows an enlargement according to FIG. 14.

FIG. 15 shows a cross section of a third embodiment corresponding to the one shown in FIG. 10 for the second embodiment. The figure shows the first restriction layer 21, the second restriction layer 22, the distance core 23 and the hollow profiles 24. In this embodiment the hollow profile is positioned in correspondence to the second restriction layer in the same way as in the embodiments shown before, i.e. the hollow profile has a plane side 55 being mainly parallel with the second restriction layer 22 and parallel with the first restriction layer 21. The hollow profile 24 is provided with a reinforcement 150 along the parallel side 55 and up to half the parallel side 55 for the connected sides 53, 54. The reinforcement 150 is in the shape of an increased thickness of material to approximately double compared to the thickness of the rest of the material of the second restriction layer. Further embodiments are conceivable where whole of the hollow profile 24 has such an increased thickness of material. The figure shows also that the hollow profile 24 in this embodiment is closed along the contact line 51 at the second restriction layer 22.

Figure 16:
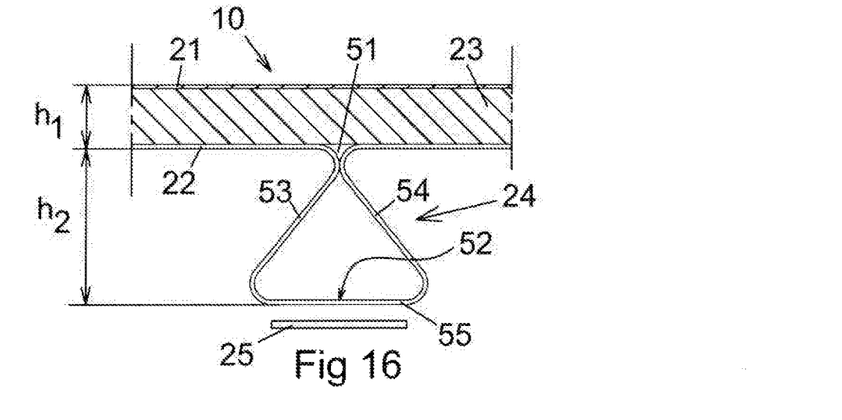
FIG. 16 shows an alternative shape of the stiffening element according to FIG. 5, FIGS. 17 through 20 show further alternative shapes of the stiffening element.

FIG. 16 shows an enlargement of the stiffening element 11 of the sandwich element in the shape of a hollow profile 24 with a rounded off triangular cross section with the plane base 55 of the triangle in parallel position to the first restriction layer 21 and the second restriction layer 22 as well. The two legs 53, 54 of the triangle together with the base 55 of the triangle form the closed hollow profile 24, which has been cold formed from a metal plate of a homogenous thickness, such that the surfaces, forming the hollow profile 24, are abutting each other at the contact line 51. The distance core 23 is positioned between the first restriction layer 21 and the second restriction layer 22, said distance core may be in shape of an injected polymer or as one or more plates being glued onto the two restriction layers. As is indicated in the figure the hollow profile 24 can be formed in that two layer parts are connected to each other along a joint line 52 as described above. If a greater stiffness is wanted than the one obtained by the homogenous metal thickness of the second restriction layer 22 including the hollow profile 24, a plane reinforcing bar 25 may be glued onto the base of the triangle as indicated in the figure. The projecting distance $h_2$ of the stiffening element from the second restriction layer 22 is larger than the largest perpendicular distance $h_1$ between the first restriction layer and the second restriction layer. At plane and parallel restriction layers 21, 22 $h_1$ is constant as is shown in the figure.

Figure 17:
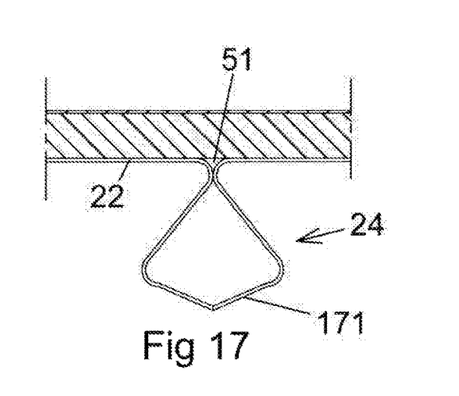
Figure 18:
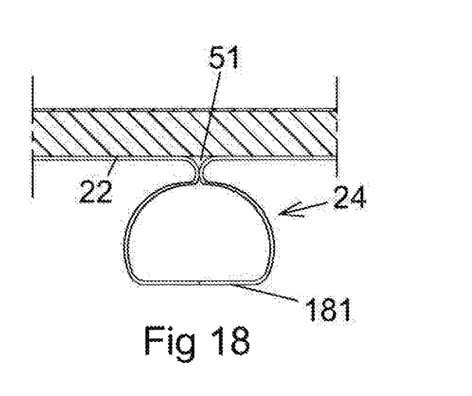
Figure 19:
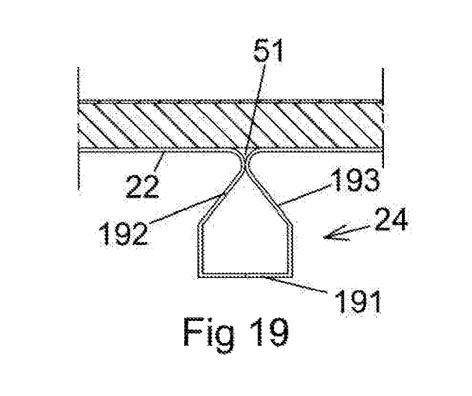
Figure 20:
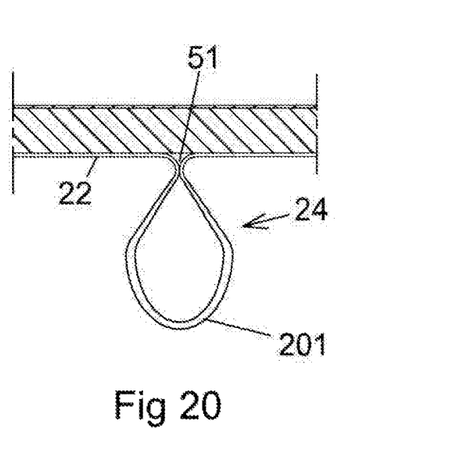

FIGS. 17 through 20 show alternative embodiments of the cross section of the hollow profile 24, where all the hollow profiles are closed along the contact line 51. Also these embodiments can be made of two parts being joined according to what has been taught above. Furthermore the embodiments may be reinforced materially at the surfaces of the hollow profile positioned furthest away from the second restriction layer 22 similar to the embodiments shown above. FIG. 17 shows the hollow profile 24 in cross section as a bell shape having a symmetrically broken lower restriction surface 171. FIG. 18 shows the hollow profile 24 in cross section as a circle with a plane parallel side 181. FIG. 19 shows the hollow profile 24 in cross section partly rectangular in shape having a plane parallel side 191 and with angled joint sides 192, 193. FIG. 20 shows the hollow profile 24 in cross section shaped as a teardrop, the lower surface 201 shown with a curve.

Within the scope of the invention the hollow profiles can be varied still further above those being shown.

Preferable applications of the sandwich element are as a load floor in a cargo vehicle, where the second restriction layer corresponds to a lower layer in the shape of a structure plate having enclosed load carriers in form of elongated beams corresponding to the hollow profiles. Each one of the beams is formed together with the plate and where the plate is somewhat convex between the beams. Thus this layer part of the construction is made from an originally plane plate. The shape of the rolled beams does not need to be triangular, such as is shown by the embodiments, but can have a rectangular or circle/semicircle cross section. Furthermore the distance core corresponds to an intermediate layer/core of a light weight material, e.g. a foam material for separation and damping. This material may also have the function as an adhesive to the lower and a top layer. The first restriction layer corresponds to a top layer in the shape of a structural plane metal plate, which is aimed to act as a wear surface on the floor in the cargo vehicle.

The overall measure of the sandwich construction at a possible embodiment is about 40 mm, of which the top layer is 0.5 mm through 0.6 mm; the intermediate layer is about 5 mm; and the bottom layer without the beams is 0.8 mm through 1.0 mm. However other measures of the layers may be suitable for other embodiments.

The invention claimed is:

1. A sandwich element, comprising:
   a first restriction layer made of metal;
   a second restriction layer made of metal; and
   a distance core of a foam material between the first restriction layer and the second restriction layer,
   wherein the second restriction layer includes stiffening elements arranged in parallel with each other and individually, or together with a corresponding abutting stiffening element, form a closed hollow profile at one side of the sandwich element, and
   wherein the stiffening elements are directed outwards from the second restriction layer and are outside of the distance core.

2. A sandwich element according to claim 1, wherein the stiffening elements are integrated with the second layer and alone or as two layer parts abutting each other together form a stiffening element.

3. A sandwich element according to claim 1, wherein the hollow profile is closed along a contact line in the second restriction layer.

4. A sandwich element according to claim 1, wherein the hollow profile is provided with a reinforcement.

5. A sandwich element according to claim 4, wherein said reinforcement is in a form of an increased thickness of material of at least one of the stiffening elements relative to the thickness of material of the rest of the second restriction layer.

6. A sandwich element according to claim 4, wherein said reinforcement is in a form of an increased thickness of material of at least one of the stiffening elements relative to the thickness of material of the rest of the second restriction layer, wherein said reinforcement is in a form of a reinforcing bar bonded to an outer surface of at least one of the stiffening elements having a triangular hollow profile and the outer surface being parallel with the first restriction layer.

7. A sandwich element according to claim 1, wherein the second restriction layer between two adjacent stiffening elements is planar, and wherein the first and the second restriction layers are parallel with each other.

8. A sandwich element according to claim 1, wherein the second restriction layer between two adjacent stiffening elements is in a shape of a single bent surface.

9. A sandwich element according to claim 8, wherein the single bent surface is positioned to have a greatest distance from the first restriction layer at a contact line in the second restriction layer.

10. A sandwich element according to claim 9, wherein the single bent surface at a cross section in a normal to and through the sandwich element, made at a right angle to an extension of the two stiffening elements, is symmetrical about a normal to the first restriction layer positioned between the two stiffening elements.

11. A sandwich element according to claim 1, wherein at least one of the stiffening elements at a cross section normal to its length direction has the shape of an isosceles triangle.

12. A sandwich element according to claim 11, wherein the at least one stiffening element at a cross section normal to its length direction has the shape of an equilateral triangle.

13. A sandwich element according to claim 1, wherein at least one of the stiffening elements has a planar, side positioned in parallel to the first restriction layer.

14. A load floor shaped as a sandwich element according to claim 1, where the sandwich element includes:
   a first restriction layer made of metal;
   a second restriction layer made of metal; and
   a distance core of a foam material between the first restriction layer and the second restriction layer,
   wherein the second restriction layer includes stiffening elements arranged in parallel with each other and individually, or together with a corresponding abutting stiffening element, form a closed hollow profile at one side of the sandwich element, and
   wherein the stiffening elements are directed outwards from the second restriction layer and are outside of the distance core, and
   wherein the first restriction layer is a top layer of the load floor and the second restriction layer is a lower layer of the sandwich element in the load floor.

15. The load floor according to claim 14, wherein the load floor is a part of a cargo vehicle.

16. A method of manufacturing of a sandwich element, comprising:
   forming a first restriction layer made of metal;
   forming a second restriction layer made of metal;
   forming a distance core of a foam material between the first restriction layer and the second restriction layer;
   arranging in the second restriction layer stiffening elements in parallel with each other and individually, or together with a corresponding abutting stiffening element, to form a closed hollow profile at one side of the sandwich element, and
   directing the stiffening elements outwards from the second restriction layer, wherein the stiffening elements are formed outside of the distance core.

17. The method of manufacturing of a sandwich element according to claim 16, wherein the hollow profile is shaped by cold forming the second restriction layer alone or by cold forming two layer parts forming the second restricting layer and bringing the two layer parts to abut each other.

* * * * *